United States Patent
Forster

[15] 3,675,335
[45] July 11, 1972

[54] WIRE CUTTING GAUGE
[72] Inventor: Mark Forster, 12556 25th Avenue, N.E., Seattle, Wash. 98125
[22] Filed: Jan. 7, 1970
[21] Appl. No.: 1,224

[52] U.S. Cl. .................................. 33/168 R, 72/476
[51] Int. Cl. .................................. G01c 3/30, G01c 5/02
[58] Field of Search ............... 29/203; 72/476; 140/71, 123; 33/168 R, 178 B, 147 K

[56] References Cited
UNITED STATES PATENTS

| | | | |
|---|---|---|---|
| 3,142,484 | 6/1964 | Press | 72/476 |
| 1,860,174 | 5/1932 | Cronk | 33/168 R |
| 3,151,398 | 10/1964 | Torrey | 33/147 K |
| 2,928,181 | 3/1960 | Siemantel | 33/178 B |

Primary Examiner—William D. Martin, Jr.
Assistant Examiner—Dennis A. Dearing
Attorney—Roy E. Mattern, Jr.

[57] ABSTRACT

A wire cutting length gauge, used while wire is being cut in various groups of selected lengths, has multiple side by side holes of various depths to receive wire or tubing. After full insertion of the wire or tubing into a respective hole, a cutting location on the wire or tubing is determined, corresponding to the entry of the respective side by side hole. Each wire subsequently fully inserted in the same hole has its cutting location consistently determined at the same length.

1 Claim, 3 Drawing Figures

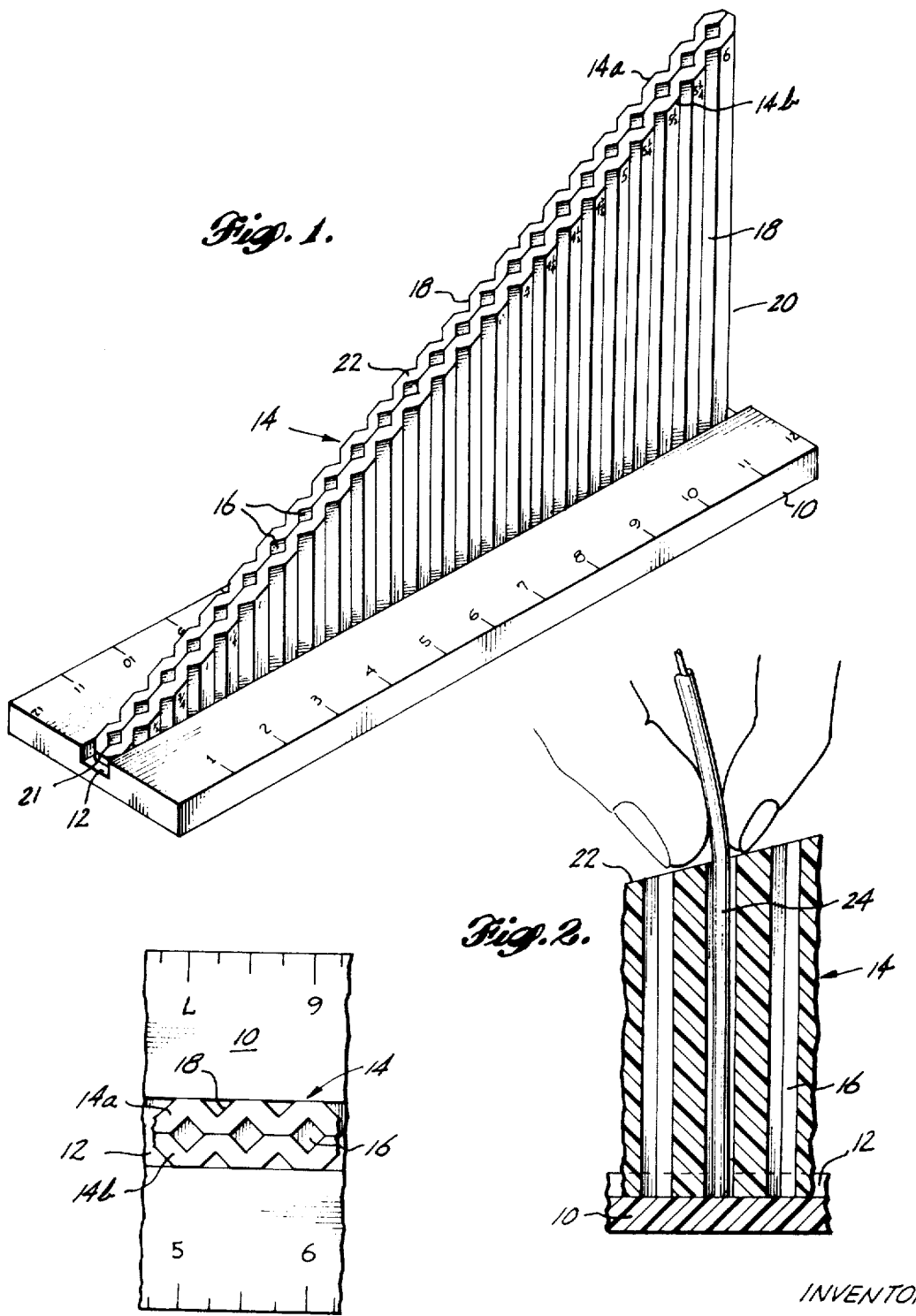

WIRE CUTTING GAUGE

BACKGROUND OF INVENTION

Previous wire cutting length gauges have been primarily of an automatic and/or of a costly type of construction. Therefore, a production shop, generally a smaller one, when faced with a demand for a considerable quantity of short pieces of wire or tubing often was required to build custom-made jigs, or rely upon slow and costly methods of measuring each piece to be cut.

Also, the use of blind persons in "piece work" type of employment is desirous. However, in this respect, any use of automatic wire cutting machinery presents dangers that often eliminate any employment of such handicapped persons. Therefore, this need for a safe, low cost, easy to use, wire cutting gauge offering a multiplicity of measuring openings to be used to determine accurately shorter lengths of wires and tubing in a small or large production facility, is fulfilled by this invention.

SUMMARY OF INVENTION

A wire cutting gauge is provided to insure accurate measuring of a variety of selective lengths of wire or tubing to be cut to match the length or depths of various receiving holes of the gauge, and thereafter to be ready for accurate installation in a circuit or system.

DRAWINGS OF PREFERRED EMBODIMENTS

FIG. 1 is a front isometric view of the wire cutting gauge unit, for clarity only a few depth indication markings are shown.

FIG. 2 is a longitudinal fragmentary sectional view, on an enlarged scale, of the wire cutting gauge shown in FIG. 1. A portion of wire to be measured is shown being placed in a desired opening selected among the multiple openings or holes.

FIG. 3 is a fragmentary plan view on an enlarged scale of the wire cutting gauge shown in FIG. 1.

DEXCRIPTION OF PREFERRED EMBODIMENTS

A preferred embodiment of a wire cutting gauge 8 is shown in FIGS. 1 through 3 having multiple openings or holes. Referring to FIG. 1, a base 10 is substantially rectangular in shape. It has a longitudinal slot, or channel, 12 of a depth and width suitable to firmly receive upstanding body portion 14 of the gauge 8. Body portion 14 is preferably permanently secured to base 10 by any means such as gluing.

Body or gauge portion 14 is formed of two opposing plates 14a and 14b, having matching recesses to form multiple internal openings 16. External recesses 18 are provided to maintain a somewhat constant wall thickness to conserve material. Also in the process of injection moldings, a constant wall thickness is desirous to reduce the "cycle" or curing time.

The embodiment as shown in FIG. 1 because of its mirror image portions 14a and 14b joined on a longitudinal center, lends itself to a common and economical manufacturing process of injection molding. A single sheet of the thickness and form of 14a or 14b of a desired width, such as indicated in FIG. 1 is injection molded. To commence to form a body portion 14, two transverse cuts are made, then a diagonal cut of a predetermined degree is made across the injection molded sheet. This diagonal cut is made between the transverse cuts that are at right angles and determine edges 20 and 21. The two resulting formed triangles 14a and 14b are then placed face to face and inserted in longitudinal slot 12 of base 10. Before final assembly the two triangular plats 14a and 14b are secured together such as by gluing, once proper alignment and fitting is achieved. The diagonal shaped surface 22 is of a predetermined angle to assure that the increased depth of each internal opening 16 is of a dimension to accommodate the depth graduation desired in a given gauge. For example, although new tooling would be required if depth graduations of 1/16 inch increments were desired, between adjacent openings 16, a lesser angle of sloped surface 22 would be required than the angle of the sloped surface 22 that would result in depth graduations of 1/8 inch increments between openings 16.

To complete gauge 8, as shown in FIG. 1, the printing or embossing of a graduated scale of correct depth markings at the entry of the respective depth openings 16 is accomplished.

In FIGS. 1 through 3, openings 16 are shown of a given size. However, in other gauges 8 openings 16 are varied throughout or resized uniformly throughout to accommodate wires or tubing of any other desired gauges or diameters.

FIG. 3 illustrates the insertion of a length of wire 24, normally supplied from a continuous reel, not shown, into one of a series of openings 16. After full insertion, the normal procedure to grasp wire 24, with a conventional wire cutter, adjacent to sloped surface 22. The wire 24 would then be withdrawn from gauge opening 16 and moved a distance away from the opening before cutting and dropping the cut, measure, wire, preferably into a pre-labeled box for like lengths of wire or tubing.

Body portion 14, as shown in FIGS. 1 through 3, is not necessarily limited to this exact configuration. Openings 16 could readily be formed into other shapes, for example by using arcuate or square formed extrusions. The primary purpose of any configuration would be to keep die costs down and to maintain a constant wall thickness for lower material costs and better curing of plastics when they are used.

Another feature of this invention, not shown in the drawings, is the changeable blanking off of any selected number of the openings as might be desired. This is desirous in certain production runs, especially during employment of blind persons. For example, pieces of tape are used to close off all but one opening, or a group of widely spaced openings, thus enabling a blind person to use this device more readily. Of a more permanent nature, channel-shaped cap pieces could be provided that would removably fit snugly over the top of said openings and thus allow "selection" of any given opening or a set of openings.

A further provision shown is the printing of a scaled ruler on base 10 at a convenient longitudinal edge location to permit the measuring of any length wire longer than the depths provided in the gauge being used.

A wire cutting gauge of the configuration described and illustrated or similar to it, is constructed very economically. It fulfills most requirements and is available for use by personnel of a small shop that previously could not afford the prior costly automatic cutter machines.

I claim:

1. A wire cutting gauge to receive wire, for example, being removed from a roll, to be cut in groups of various selected lengths for subsequent installation in electrical and electronic circuits, the wires to be fully inserted into selected spaced holes of various depths, the depth of insertion being identified by gripping the wire with one's fingers and with a cutting tool as the wire is withdrawn and placed over a respective collection location for wires cut to the particular selected length, comprising:

a. a body having an overall depth progressively increased and provided with spaced holes of resultingly increasing depths which are marked with indicia indicating the depth of the holes into which wire is selectively inserted for determining cut off measurements, the horizontal cross sectional pattern of the body presenting substantially uniform thickness at all locations by being derived from joining two mirror like longitudinal plate sections joined along the centerline of the body, and b. a base having a longitudinal groove to receive the bottom portions of the two mirror like longitudinal plate sections of the body and to thereby serve as the bottom of the respective holes in the body of various depths which determine the length of the inserted wires being measured and subsequently cut.

* * * * *